United States Patent [19]

Gordon et al.

[11] 4,406,012
[45] Sep. 20, 1983

[54] NUCLEAR FUEL ELEMENTS HAVING A COMPOSITE CLADDING

[75] Inventors: Gerald M. Gordon; Robert L. Cowan, II, both of Fremont; John H. Davies, San Jose, all of Calif.

[73] Assignee: General Electric Company, San Jose, Calif.

[21] Appl. No.: 228,344

[22] Filed: Jan. 26, 1981

Related U.S. Application Data

[63] Continuation of Ser. No. 95,161, Nov. 19, 1979, abandoned, which is a continuation of Ser. No. 725,824, Sep. 23, 1976, abandoned, which is a continuation of Ser. No. 522,769, Nov. 11, 1974, abandoned.

[51] Int. Cl.³ .............................................. G21C 3/20
[52] U.S. Cl. ................................................... 376/414
[58] Field of Search ..................... 376/414, 416, 417

[56] References Cited

U.S. PATENT DOCUMENTS

| | | | |
|---|---|---|---|
| 3,053,743 | 9/1962 | Cain, Jr. ............................ | 376/414 |
| 3,184,393 | 5/1965 | Blomeyer et al. ................. | 376/416 |
| 3,230,150 | 1/1966 | Martin et al. ..................... | 376/416 |
| 4,022,662 | 5/1977 | Gordon et al. .................... | 376/416 |
| 4,029,545 | 6/1977 | Gordon et al. .................... | 376/417 |
| 4,200,492 | 4/1980 | Armijo et al. ..................... | 376/417 |
| 4,229,260 | 10/1980 | Johson et al. ..................... | 376/417 |
| 4,316,771 | 2/1982 | Lee .................................... | 376/415 |

FOREIGN PATENT DOCUMENTS

| | | | |
|---|---|---|---|
| 51-52690 | 12/1977 | Japan ................................. | 376/414 |
| 54-23898 | 2/1979 | Japan ................................. | 376/414 |
| 55-89792 | 7/1980 | Japan ................................. | 376/414 |
| 55-89793 | 7/1980 | Japan ................................. | 376/414 |
| 854122 | 11/1960 | United Kingdom ............... | 376/414 |
| 933500 | 8/1963 | United Kingdom ............... | 376/416 |

*Primary Examiner*—Sal Cangialosi
*Attorney, Agent, or Firm*—Ivor J. James, Jr.; Samuel E. Turner; Raymond G. Simkins

[57] ABSTRACT

An improved nuclear fuel element is disclosed for use in the core of nuclear reactors. The improved nuclear fuel element has a composite cladding of an outer portion forming a substrate having on the inside surface a metal layer selected from the group consisting of copper, nickel, iron and alloys of the foregoing with a gap between the composite cladding and the core of nuclear fuel. The nuclear fuel element comprises a container of the elongated composite cladding, a central core of a body of nuclear fuel material disposed in and partially filling the container and forming an internal cavity in the container, an enclosure integrally secured and sealed at each end of said container and a nuclear fuel material retaining means positioned in the cavity. The metal layer of the composite cladding prevents perforations or failures in the cladding substrate from stress corrosion cracking or from fuel pellet-cladding interaction or both. The substrate of the composite cladding is selected from conventional cladding materials and preferably is a zirconium alloy.

6 Claims, 2 Drawing Figures

NUCLEAR FUEL ELEMENTS HAVING A COMPOSITE CLADDING

The Government has rights in this invention pursuant to Subcontract No. 3-20-46 under Prime Contract No. DE-AC02-77ET-34001 (formerly EN-77-C-02-4473) awarded by the U.S. Department of Energy.

This is a continuation of application Ser. No. 095,161, filed Nov. 19, 1979, which is a continuation of Ser. No. 725,824, filed Sept. 23, 1976, which in turn is a continuation of Ser. No. 522,769, filed Nov. 11, 1974, all now abandoned.

BACKGROUND OF THE INVENTION

This invention relates broadly to an improvement in nuclear fuel elements for use in the core of nuclear fission reactors, and more particularly to an improved nuclear fuel elemennt having a composite cladding container having an outer portion forming a substrate and a metal layer on the inside surface of the substrate.

Nuclear reactors are presently being designed, constructed and operated in which the nuclear fuel is contained in fuel elements which can have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves several purposes and two primary purposes are: first, to prevent contact and chemical reactions between the nuclear fuel and the coolant or the moderator if a moderator is present, or both if both the coolant and the moderator are present; and second, to prevent the radioactive fission products, some of which are gases, from being released from the fuel into the coolant or the moderator or both if both the coolant and the moderator are present. Common cladding materials are stainless steel, aluminum and its alloys, zirconium and its alloys, niobium (columbium), certain magnesium alloys, and others. The failure of the cladding, i.e., a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical or chemical reactions of these cladding materials under certain circumstances. Zirconium and its alloys, under normal circumstances, are excellent nuclear fuel claddings since they have low neutron absorption cross sections and at temperatures below about 750° F. (about 398° C.) are strong, ductile, extremely stable and non-reactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this undesirable performance is promoted by localized mechanical stresses due to fuel cladding differential expansion (stresses in the cladding are localized at cracks in the nuclear fuel). Corrosive fission products are released from the nuclear fuel and are present at the intersection of the fuel cracks with the cladding surface. Fission products are created in the nuclear fuel during the fission chain reaction during operation of a nuclear reactor. The localized stress is exaggerated by high friction between the fuel and the cladding.

Within the confines of a sealed fuel element, hydrogen gas can be generated by the slow reaction between the cladding, and the residual water inside the cladding may build up to levels which under certain conditions can result in localized hydriding of the cladding with concurrent local deterioration in the mechanical properties of the cladding. The cladding is also adversely affected by such gases as oxygen, nitrogen, carbon monoxide and carbon dioxide over a wide range of temperatures.

The zirconium cladding of a nuclear fuel element is exposed to one or more of the gases listed above and fission products during irradiation in a nuclear reactor and this occurs in spite of the fact that these gases and fission product elements may not be present in the reactor coolant or moderator, and further may have been excluded as far as possible from the ambient atmosphere during manufacture of the cladding and the fuel element. Sintered refractory and ceramic compositions, such as uranium dioxide and other compositions used as nuclear fuel, release measurable quantities of the aforementioned gases and fission products upon heating, such as during fuel element manufacture and further release fission products during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

Thus in light of the foregoing, it has been found desirable to minimize attack of the cladding from water, water vapor and other gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters.

Another approach has been to coat the nuclear fuel material with a ceramic to prevent moisture coming in contact with the nuclear fuel material as disclosed in U.S. Pat. No. 3,108,936. U.S. Pat. No. 3,085,059 presents a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 presents jacketed fissionable slugs of uranium canned in a metal case in which the protective jackets or coverings for the slugs are a zinc-aluminum bonding layer. U.S. Pat. No. 2,849,387 discloses a jacketed fissionable body comprising a plurality of open-ended jacketed body sections of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese Patent Publication No. SHO 47-46559 dated Nov. 24, 1972, discloses consolidating discrete nuclear fuel particles into a carbon-containing matrix fuel composite by coating the fuel particles with a high density, smooth carbon-containing coating around the pellets. Still another coating disclosure is Japanese Patent Publication No. SHO 47-14200 in which the coating of one of two groups of pellets is with a layer of silicon carbide and the other group is coated with a layer of pyrocarbon or metal carbide.

The coating of a nuclear fuel material introduces reliability problems in that achieving uniform coatings free of faults is difficult. Further, the deterioration of the coating can introduce problems with the long-lived performance of the nuclear fuel material.

U.S. patent application Ser. No. 330,152 filed Feb. 6, 1973 discloses a method for preventing corrosion of nuclear fuel cladding consisting of the addition of a metal such as niobium to the fuel. The additive can be in the form of a powder, provided the subsequent fuel processing operation does not oxidize the metal, or incorporated into the fuel element as wires, sheets or other forms in, around, or between fuel pellets.

Document GEAP-4555 dated February, 1964 discloses a composite cladding of a zirconium alloy with an inner lining of stainless steel metallurgically bonded to the zirconium alloy, and the composite cladding is fabricated by use of extrusion of a hollow billet of the zirconium alloy having an inner lining of stainless steel. This cladding has the disadvantage that the stainless steel develops brittle phases, and the stainless steel layer involves a neutron absorption penalty of about ten to fifteen times the penalty for a zirconium alloy layer of the same thickness.

U.S. Pat. No. 3,502,549 discloses a method of protecting zirconium and its alloys by the electrolytic deposition of chrome to provide a composite material useful for nuclear reactors. A method for electrolytic deposition of copper on Zircaloy-2 surfaces and subsequent heat treatment for the purpose of obtaining surface diffusion of the electrolytically deposited metal is presented in *Energia Nucleare* Volume 11, number 9 (September 1964) at pages 505-508. In *Stability and Compatibility of Hydrogen Barriers Applied to Zirconium Alloys* by F. Brossa et al (European Atomic Energy Community, Joint Nuclear Research Center, EUR 4098e 1969), methods of deposition of different coatings and their efficiency as hydrogen diffusion barriers are described along with an Al-Si coating as the most promising barrier against hydrogen diffusion. Methods for electroplating nickel on zirconium and zirconium tin alloys and heat treating these alloys to produce alloy-diffusion bonds are disclosed in *Electroplating on Zirconium and Zirconium-Tin* by W. C. Schickner et al (BMl-757, Technical Information Service, 1952). U.S. Pat. No. 3,625,821 presents a fuel element for a nuclear reactor having a fuel cladding tube with the inner surface of the tube being coated with a retaining metal of low neutron capture cross section such as nickel and having finely dispersed particles of a burnable poison disposed therein. *Reactor Development Program Progress Report* of August, 1973 (ANL-RDP-19) discloses a chemical getter arrangement of a sacrificial layer of chromium on the inner surface of a stainless steel cladding.

Another approach has been to introduce a barrier between the nuclear fuel material and the cladding holding the nuclear fuel material as disclosed in U.S. Pat. No. 3,230,150 (copper foil), German Patent Publication DAS No. 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, some of the foregoing references involve incompatible materials with either the nuclear fuel (e.g., carbon can combine with oxygen from the nuclear fuel), or the cladding (e.g., copper and other metals can react with the cladding, altering the properties of the cladding), or the nuclear fission reaction (e.g., by acting as neutron absorbers). None of the listed references disclose solutions to the recently discovered problem of localized chemical-mechanical interactions between the nuclear fuel and the cladding.

Further approaches to the barrier concept are disclosed in U.S. patent application Ser. No. 441,131, filed Feb. 11, 1974, now U.S. Pat. No. 3,969,186, (refractory metal such as molybdenum, tungsten, rhenium, niobium and alloys thereof in the form of a tube or foil of single or multiple layers or a coating on the internal surface of the cladding), and U.S. patent application Ser. No. 441,133, filed Feb. 11, 1974, now U.S. Pat. No. 3,925,151, (liner of zirconium, niobium or alloys thereof between the nuclear fuel and the cladding with a coating of a high lubricity material between the liner and the cladding).

Accordingly, it has remained desirable to develop nuclear fuel elements minimizing the problems discussed above.

SUMMARY OF THE INVENTION

A particularly effective nuclear fuel element for use in the core of a nuclear reactor has a composite cladding container comprised of an outer portion forming a substrate having on the inside surface a metal layer selected from the group consisting of copper, nickel, iron and alloys of the foregoing. The metal layer can be bonded to the substrate by a physical bond (such as an electroplated layer) or by a metallurgical bond, and the metal layer forms a shield between the substrate and the nuclear fuel material held in the container. The metal layer serves as a preferential reaction site for reaction with volatile impurities or fission products present inside the nuclear fuel element and in this manner serves to protect the cladding from exposure to and attack by the volatile impurities or fission products. Methods of manufacturing the composite cladding are also presented including (a) electroplating the metal layer on the substrate, (b) electroplating the metal layer on the substrate and heating the substrate and metal layer to produce diffusion and a metallurgical bond between the substrate and the metal layer, (c) electroplating the metal layer on the substrate and tube reducing the composite to produce a metallurgical bond between the substrate and the metal layer, (d) bonding an insert tube comprised of one of the above metals or an alloy thereof to a billet of the substrate material, extruding the composite followed by tube reduction so that a metallurgical bond is established between the metal layer and the substrate, and (e) inserting a close fitting liner of one of the above metals or an alloy thereof into a billet of the substrate material followed by tube reduction of the assembly, with intermediate anneals if needed, to produce a metallurgical bond between the metal layer and the substrate.

This invention has the striking advantage that the substrate of the cladding is protected from contact with fission products, corrosive gases, etc., by the metal layer and the metal layer introduces negligible neutron capture penalties.

OBJECTS OF THE INVENTION

It is an object of this invention to provide a nuclear fuel element capable of operating in nuclear reactors for extended periods of time without the occurrence of splitting of the cladding, corrosion of the cladding from fission products and nuclear fuel impurities or other fuel failure problems.

It is another object of this invention to provide a nuclear fuel element with a composite cladding comprising a substrate having on the inside surface a metal layer so that the metal layer provides protection to the substrate.

Still another object of this invention is to provide a nuclear fuel element having a composite cladding of a substrate and a metal layer on the substrate with the metal layer being comprised of copper, nickel, iron and alloys of the foregoing.

Another object of this invention is to provide an economical process for producing a composite cladding for a nuclear fuel element using either electroplating, electroplating with a diffusion bonding step, electroplating followed by tube reduction, or coextrusion of a zirconium alloy billet with an internally bonded sleeve of one of the above listed metals or a combination thereof followed by a tube reduction step, or tube reduction of a zirconium alloy tube shell with an inner liner of one of the above listed metals or a combination thereof.

The foregoinng and other objects of this invention will become apparent to a person skilled in the art from reading the following specification and the appended claims with reference to the accompanying drawings described immediately hereinafter.

DESCRIPTION OF THE INVENTION

Figure 1:
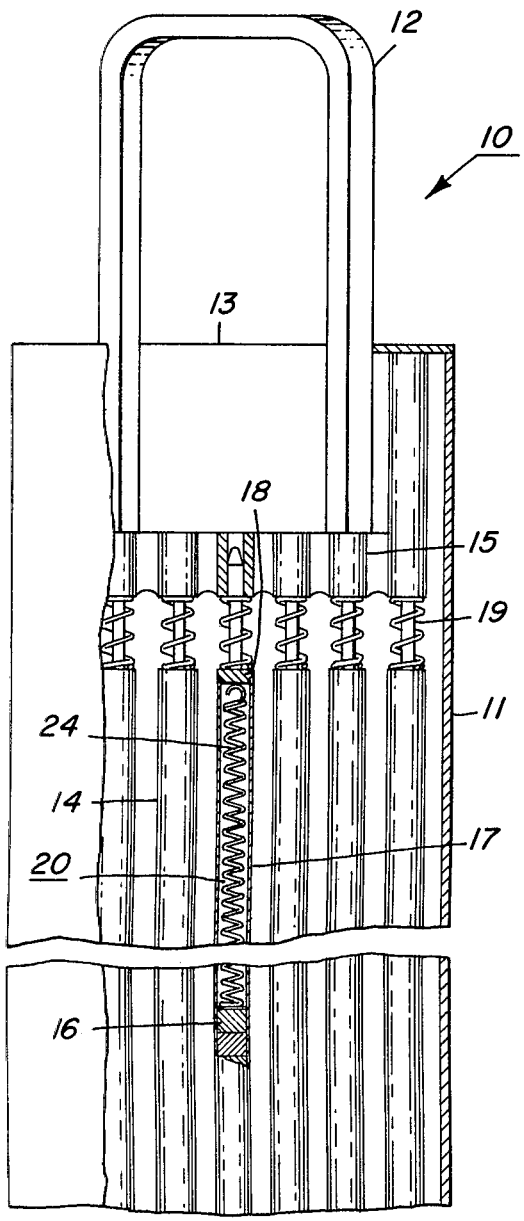
FIG. 1 presents a partial cutaway sectional view of a nuclear fuel assembly containing nuclear fuel elements constructed according to the teaching of this invention.

Referring now more particularly to FIG. 1, there is shown a partially cutaway sectional view of a nuclear fuel assembly 10. This fuel assembly 10 consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in channel 11 and supported therein by means of upper end plate 15 and a lower end plate (not shown due to the lower portion being omitted. The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorptionn and resistance to bowing and vibration which is occasionally caused by flow of the coolant at high velocity.

A nuclear fuel element or rod 14 is shown in a partial section in FIG. 1 constructed according to the teachings of this invention. The fuel element 14 includes a core or central cylindrical portion of nuclear fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 2:
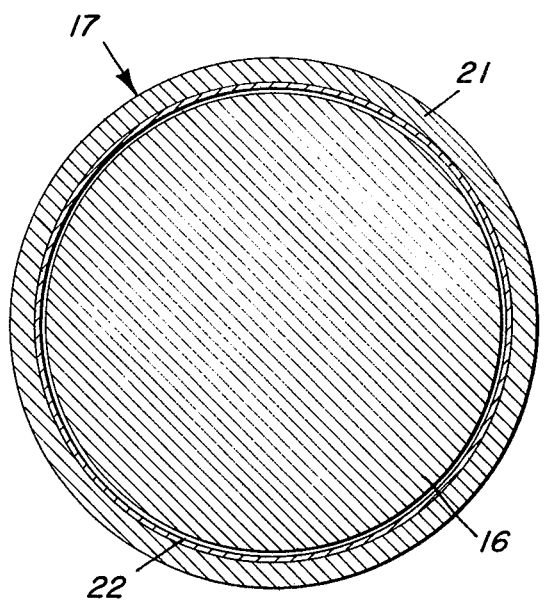
FIG. 2 presents an enlarged cross sectional view of the nuclear fuel element illustrating the teaching of this invention.

Referring now to FIG. 2, the nuclear fuel material 16 forming the central core of the fuel element 14 is surrounded by a cladding 17 hereinafter in this description also referred to as a composite and as a composite cladding. The composite cladding container encloses the core, so as to leave a gap between the core and the cladding container during use in a nuclear reactor as shown in FIG. 2. The composite cladding 17 has a substrate 21 selected from conventional cladding materials such as zirconium alloys and in a preferred embodiment of this invention the substrate 21 is a zirconium alloy such as Zircaloy-2. The substrate 21 has attached on the inside surface thereof a metal layer 22 so that the metal layer 22 forms a shield or barrier between the substrate 21 and the nuclear fuel material 16 held in the composite cladding 17. In a preferred embodiment, the metal layer 22 has a thickness of about 0.0001 inches to about 0.002 inches, and is comprised of a low neutron absorption metal selected from the group consisting of copper, nickel, iron, and alloys of the foregoing. A metal layer having a thickness less than about 0.0001 inch would be difficult to achieve on commercial cladding. A metal layer having a thickness greater than 0.002 involves an added neutron penalty. The metal layer serves as a preferential reaction site for gaseous impurities and fission products and acts as a barrier to protect the cladding from contact and reaction with such impurities and fission products.

The purity of the metal of the metal layer is an important quality and serves to impart special properties to the metal layer. Generally there is less than one weight percent of impurities in the metal layer and preferably less than 1000 parts per million. Of these the boron equivalent (from a nuclear standpoint) is kept to a level less than 40 parts per million.

The composite cladding of the nuclear fuel element of this invention has the metal layer bonded to the substrate in a strong bond. When the composite is produced by an electroplating step alone, a strong physical bond is formed. Tests designed to separate the metal barrier from the substrate have required high shearing forces or considerable plastic deformation of the substrate. For example, the electroplated coatings can be bent around a radius producing 15-20 percent permanent strain in the substrate without rupturing the electroplated metal layer. When the composite is produced by diffusion bonding after electroplating, tube reduction after electroplating, co-extrusion followed by tube reduction or by tube reduction alone, a strong metallurgical bond is formed.

It is known that the following pure metals, copper, nickel, and iron, are more resistant to the deleterious effects of radiation hardening and damage than zirconium and zirconium alloys under the conditions found in commercial nuclear fission reactors, e.g., at temperatures of about 500° to about 750° F. Thus, these metals will have more ability to withstand plastic deformation without mechanical failure than zirconium and zirconium alloys under operating nuclear reactor conditions. Thus, these metals can deform plastically from pellet-induced stresses during power transients and relieve pellet-induced stresses. In addition, these metals will not rupture mechanically and thus will also shield the zirconium alloy substrate from the deleterious action of fission products. Pellet induced stresses and strains in the fuel element can be brought about, for example, by swelling of the pellets of nuclear fuel at reactor operating conditions so that the pellet comes in contact with the cladding.

It has further been discovered that a metal layer of the thickness of about 0.0001 inches to about 0.002 inches provides stress reduction and chemical resistance sufficient to prevent nucleation of failures in the substrate portion of the cladding. The metal layer portion provides significant chemical resistance to fission products and gases that may be present in the nuclear fuel element and prevents these fission products and gases from contacting the substrate portion of the composite cladding protected by the metal barrier.

It has further been discovered that the composite cladding will help to reduce the localization of stresses and strains in the cladding. Without a composite cladding, the zirconium alloy reacts with the $UO_2$ fuel to form zirconium dioxide on the internal cladding surface. At internal clad temperatures and in the presence of radiation, this zirconium dioxide can sinter to the $UO_2$ fuel thus bonding the fuel to the clad. During fuel rod power changes this bonding can localize stresses and strains in the clad to high levels at crack locations in the $UO_2$. When the composite cladding is made with copper or nickel as the metal layer, the oxygen potential inside the fuel rod is such that an oxide can not form on the copper or nickel, and thus bonding can not occur. With an iron layer, the oxides of iron are just marginally stable for the oxygen potentials inside the fuel rod and a strong bond does not form. Thus, all of the metals considered herein for the metal layer will reduce the localization of stresses and strains in the cladding by minimizing bonding of the cladding to the nuclear fuel.

It has further been discovered that because the metal layers do not oxidize or greatly reduce the oxidation of the internal surface of the cladding over that of zirconium or zirconium alloys, the stoichiometry of the nuclear fuel material is stablized. Without the metal layer, a zirconium or zirconium alloy cladding will react with the $UO_2$ to form $ZrO_2$, thus changing the $UO_2$ stoichiometry. The chemical state of various fission products is a very strong function of the $UO_2$ stoichiometry. For example, at higher oxygen to uranium ratios, cesium forms a compound with $UO_2$ fuels. At lower oxygen to metal ratios, this cesium compound is not stable and can migrate to the lower temperature regions of the fuel rod, which is the cladding inner surface. Cesium in this location either alone or in combination with other fission products may then promote stress corrosion of a zirconium or zirconium alloy cladding. In a fuel rod having an uncoated zirconium or zirconium alloy cladding (and even if the $UO_2$ has a high initial oxygen to uranium ratio), the oxygen consumed by the oxidation of the zirconium alloy will lower this ratio, and cesium can be released to the cladding surface. With a composite cladding having a metal layer as disclosed in this invention the oxygen to uranium ratio will remain nearly constant or change at a reduced rate. Thus, a $UO_2$ with any desired stoichiometry can be used in the composite cladding with the expectation that this stoichiometry will remain constant or change with time at a much slower rate than with an uncoated zirconium or zirconium alloy.

The composite cladding used in the nuclear fuel elements of this invention can be fabricated by any of the following methods.

In one method a metal selected from copper, nickel, and iron is electroplated on the zirconium or zirconium alloy (hereinafter both referred to as zirconium) substrate so that the metal layer is uniform on the substrate. A typical electroplating process is conducted as follows:

The substrate zirconium alloy is first activated by exposure to an agitated solution of the following composition: $NH_4FHF$ (15 gms/liter), $H_2SO_4$ (0.95 gms/liter) and the balance water to make one liter. The aforementioned bath should first be aged by immersing a 20 sq. in. surface area piece of zirconium or zirconium alloy for then minutes in the bath. Then copper, nickel and iron are electroplated by employing conventional acid plating bath techniques. The composite is then outgassed in vacuum at 300°-400° F. for 3-4 hours to remove any hydrogen trapped during the plating process. Physical tests, such as plastically bending the composite through a radius, show that the plated metal layer is tightly bonded to the substrate.

In another method, the foregoing electroplating method is followed by a diffusion bonding step to metallurgically bond the layer to the zirconium alloy substrate by producing a diffusion layer. Metallographic analysis shows this diffusion layer to be about 1 to 5 microns in thickness for the recommended diffusion bonding treatment. Recommended diffusion bonding treatments are: (a) Copper layers are held for about 2-3 hours at about 1100° F. and (b) Nickel and iron layers are held for about one hour at 1350°-1400° F.

In another method used for a metal layer of nickel, iron and copper on the substrate, the metal layer is deposited by electroplating on the substrate of zirconium or a zirconium alloy to give a uniform metal layer on the substrate and then the composite is subjected to a process involving conventional cold working of the tube to reduce it to the desired size. It has been shown that this process gives a strong metallurgical bond.

In still another method, which may be utilized for a metal layer of copper, nickel and iron, an insert tube of the metal is inserted into a hollow extrusion billet of zirconium or a zirconium alloy and diffusion bonded to the extrusion billet. The composite billet is then extruded into a tube blank. This blank is an outer concentric cylinder of zirconium or a zirconium alloy with an inner concentric liner of one of the above listed metals metallurgically bonded to the zirconium or zirconium alloy, and the blank is subjected to conventional tube reduction to produce a composite cladding with the desired geometry and dimensions.

In another method used for achieving a metal layer of either nickel, iron or copper on a substrate, a hollow tube of one of the foregoing metals is inserted into an extruded tube blank of zirconium or a zirconium alloy. This hollow tube should be uniform in wall thickness, and the tube blank and hollow tube assembly are then tube reduced to produce the composite cladding. The resulting composite of the metal layer is metallurgically bonded to the zirconium or zirconium alloy substrate. The tube reducing process may employ annealing treatments at various stages of the process.

The invention includes a method of producing a nuclear fuel element comprising making a composite cladding container having a substrate and a metal layer bonded to the inside surface of the substrate which container is open at one end, filling the composite cladding container with nuclear fuel material leaving a cavity at the open end, inserting a nuclear fuel material retaining means into the cavity, applying an enclosure to the open end of the container leaving the cavity in communication with the nuclear fuel, and then bonding the end of the clad container to said enclosure to form a tight seal therebetween.

The present invention offers several advantages promoting a long operating life for the nuclear fuel element including the reduction of hydriding of the cladding substrate, the minimization of localized stress on the cladding substrate, the minimization of stress and strain corrosion on the cladding substrate, the maintenance of fuel stoichiometry, and the reduction of the probability of a splitting failure in the cladding substrate. The invention further prevents expansion (or swelling) of the nuclear fuel into direct contact with the cladding substrate, and this prevents localized stresses and strains on the cladding substrate, initiation or acceleration of stress corrosion of the cladding substrate and bonding of the nuclear fuel to the cladding substrate.

An important property of the composite cladding of this invention is that the foregoing improvements are achieved with a negligible additional neutron penalty. Such a composite cladding is readily accepted in nuclear reactors even though a composite incorporating copper, nickel, or iron can form a low melting eutectic phase with zirconium or zirconium alloys if the temperature of the composite cladding is raised above about 1769° F., about 1761° F. and about 1713° F. respectively. During a postulated loss of coolant accident in a water cooled, water moderated nuclear fission power reactor, the temperature of the fuel cladding may rise to a temperature of 2200° F. for as long as 12 minutes before cooling to ambient temperature. Tests with copper, nickel and iron coatings on a zirconium alloy substrate as the composite cladding in which the composite cladding is subjected to the above thermal cycle show that a eutectic reaction does occur. Metallographic analysis of these samples after testing show that a maximum of 0.002 inches of zirconium alloy thickness is lost by the eutectic reaction. Another test in which the above thermal cycle is applied while simultaneously applying a gas pressure to the inside of the composite tube to produce stresses in the tube show that the loss of 0.002 mils of cladding thickness due to a eutectic reaction does not seriously degrade the strength of the cladding during a postulated loss of coolant accident cycle. Further the composite cladding has a very small heat transfer penalty in that there is no thermal barrier to transfer of heat such as results in the situation where a separate foil or liner is inserted in a fuel element. Also the composite cladding of this invention is inspectable by conventional non-destructive testing methods during various stages of fabrication.

Those skilled in the art will gain a further understanding of this invention from the following illustrative, but not limiting, examples of this invention.

EXAMPLE 1

Composite tubes were produced by electroplating a uniform thickness of 0.0004 inches of copper on the inner surface of a Zircaloy-2 tube 20 inches in length. The plating was applied by using an activation solution of $NH_4FHF$ (15 grams/liter), $H_2SO_4$ (36N-0.95 grams/liter) and the balance water to make one liter, followed by electroplating with an acid copper bath of $CuSO_4.5H_2O$ (250 grams/liter), $H_2SO_4.$(36N-70 grams/liter) and $C_2H_5OH$ (10 grams/liter). The tube was then outgassed at 300°–400° F. for 4 hours in vacuum. Three such tubes were fabricated into nuclear fuel rods which were deliberately doped with a small amount of palladium iodide in cavities of the $UO_2$ nuclear fuel. The rod was then inserted into a Test Reactor, and the rod was then uprated in power in a manner that failed three out of three companion rods which were identical in all respects except that the cladding was uncoated Zircaloy-2 tubing. All three copper-Zircaloy-2 composite fuel rods survived the power uprating, and post-test examination of all six rods showed that the three non-composite rods failed by stress corrosion cracking and that the three copper-Zircaloy-2 composite rods were sound in all respects. This test showed that the copper-Zircaloy-2 composite cladding is effective in preventing stress corrosion from stress and strain conditions encountered in an operating fuel rod.

EXAMPLE 2

Composite tubes were prepared by electroplating a uniform nickel layer 0.0004 inches thick on the inner surface of a Zircaloy-2 tube by following the method presented in Example 1 electroplating in a Watts type plating bath of $N_1SO_4.6H_2O$ (330 grams/liter), $NiCl_2.6H_2O$ (45 grams/liter) and $H_3BO_3$ (85 grams/liter). The tube was outgassed for 4 hours at 300°–400° F. in vacuum. Three such tubes were fabricated into fuel rods as described in Example 1, and tests were run identical to Example #1 with identical results. All three tubes with the nickel-Zircaloy-2 composite cladding were sound after testing indicating that a composite nickel-Zircaloy-2 cladding is effective in preventing stress corrosion under the stress and strain conditions encountered in an operating fuel rod.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fission fuel element comprising a composite cladding container for fissionable fuel having an inside surface rendered resistant to stress corrosion cracking and attack attributable to nuclear fission and the effects thereof, said fuel element consisting essentially of a cladding container for fissionable fuel of at least one zirconium metal selected from the group consisting of zirconium and zirconium alloys and having bonded on the inside surface thereof a protective shielding layer of copper metal of less than about one weight percent impurities providing a barrier over the inside surface of the zirconium metal shielding said inside surface from the deleterious action of fission products, said protective shielding layer being of a thickness of about 0.0001 to about 0.002 inches, said cladding container having enclosed therein a body of fissionable fuel forming a central core with a gap between said container and body of fissionable fuel.

2. The nuclear fission fuel element of claim 1, wherein the copper metal of the protective layer has less than 1000 parts per million impurities.

3. The nuclear fission fuel element of claim 1, wherein the protective shielding layer of copper metal is metallurgically bonded to the inside surface of the zirconium metal cladding container.

4. The nuclear fission fuel element of claim 1, wherein the fissionable fuel enclosed in the composite cladding container comprises uranium, plutonium, thorium, and mixtures thereof.

5. The nuclear fission fuel element of claim 1, wherein the fissionable fuel enclosed in the composite cladding container comprises uranium dioxide.

6. A nuclear fission fuel element comprising a composite cladding container for fissionable fuel having an inside surface rendered resistant to stress corrosion cracking and attack attributable to nuclear fission and the effects thereof, said fuel element consisting essentially of a cladding container for fissionable fuel of at least one zirconium metal selected from the group consisting of zirconium and zirconium alloys and having bonded on the inside surface thereof a protective shielding layer of copper metal of less than 1000 parts per million impurities providing a barrier over the inside surface of the zirconium metal shielding said inside surface from the deleterious action of fission products, said protective shielding layer being of a thickness of about 0.0001 to about 0.002 inches, said cladding container having enclosed therein a body of fissionable fuel comprising uranium dioxide forming a central core with a gap between said container and body of fissionable fuel during use in a nuclear reactor.

* * * * *